United States Patent [19]

Jayawant

[11] Patent Number: 4,804,480

[45] Date of Patent: Feb. 14, 1989

[54] DESTRUCTION OF NITROPHENOLS

[75] Inventor: Madhusudan D. Jayawant, Hockessin, Del.

[73] Assignee: E. I. Du Pont de Nemours and Company, Wilmington, Del.

[21] Appl. No.: 947,320

[22] Filed: Dec. 29, 1986

[51] Int. Cl.$^4$ ............................................. C02F 1/72
[52] U.S. Cl. .................................... 210/759; 210/763; 210/909; 210/917
[58] Field of Search ............... 210/721, 759, 763, 766, 210/909, 917

[56] References Cited

U.S. PATENT DOCUMENTS

| | | | |
|---|---|---|---|
| 3,637,761 | 1/1972 | Kuwata et al. | 260/346.3 |
| 4,294,703 | 10/1981 | Wilms et al. | 210/763 |
| 4,370,241 | 1/1983 | Junkermann et al. | 210/759 |
| 4,604,214 | 8/1986 | Carr et al. | 210/909 |
| 4,623,465 | 11/1986 | Klibanou | 210/759 |
| 4,708,703 | 10/1987 | Bockrath et al. | 210/909 |

FOREIGN PATENT DOCUMENTS

| | | | |
|---|---|---|---|
| 646440 | 8/1962 | Canada | 210/759 |
| 77449 | of 1974 | Japan. | |
| 49-6763 | 1/1974 | Japan. | |
| 2056962 | 3/1981 | United Kingdom. | |

OTHER PUBLICATIONS

Edward J. Keating, Richman A. Brown and Edward S. Greenberg, "Phenolic Problems Solved with Hydrogen Peroxide Oxidation", Dec. 1978, Industrial Water Engineering, pp. 22–27.

William G. Strunk, "Hydrogen Peroxide Treats Diverse Wastewaters", Jan./Feb. 1979, Industrial Wastes, pp. 32–34.

Primary Examiner—Peter Hruskoci
Attorney, Agent, or Firm—Craig H. Evans

[57] ABSTRACT

The present invention relates to a process for destroying polynitrophenols or their salts in an aqueous waste by treating with at least two moles of hydrogen peroxide per mole of polynitrophenol in the presence of from 0.002 to 0.7 moles of an iron salt per mole of polynitrophenol. The destruction takes place at a pH lower than 4 and a temperature greater than 65° C.

14 Claims, No Drawings

DESTRUCTION OF NITROPHENOLS

FIELD OF THE INVENTION

The present invention relates to a process for destroying nitrophenols or their salts or a mixture thereof in an aqueous waste by treating the waste with hydrogen peroxide in the presence of a soluble iron compound at a pH of less than 4 and a temperature of greater than 65° C.

BACKGROUND OF THE INVENTION

Nitration of benzene to produce nitrobenzene and dinitrobenzene is commercially important technology. During the production of these compounds, by-product nitrophenols are formed. These nitrophenols are environmentally undesirable being noxious in nature and causing intense coloration of process waste water. In particular, these compounds tie up the oxygen that is necessary to support life in the streams to which the waste discharges. They can cause substantial quantities of suspended matter and excessive coloration at the point of discharge. They can cause an objectionable taste and odor in potable water and fish flesh.

Various biological, physical and chemical methods have beem employed to treat these nitrophenols, which, particularly in the case of the polynitrophenols, are difficult to destroy. The focus of this application is on the chemical methods and particularly on those using hydrogen peroxide.

"Phenolic Problems Solved With Hydrogen Peroxide Oxidation" by Keating et al. at pages 22 to 27 of the December 1978 issue of *Industrial Water Engineering* teaches the treatment of phenolic wastes, including mononitrophenols and dinitrophenols but not trinitrophenols, using Fenton's Reagent (hydrogen peroxide and ferrous iron). The article concludes that ferric as well as ferrous iron can catalyze oxidation of phenols with hydrogen peroxide, that iron ion levels of from 10–20 μg/gm phenol are recommended when phenolics are no greater than 2000 μg/gm waste water. Higher phenol concentrations require at least 100:1 phenol:iron ratios. Optimum results occur when initial pH of the phenol solution is between 5 and 6. The reaction is carried out at a mole ratio of 3:1 hydrogen peroxide to phenol. At the end of one hour 2,4- and 2,5-dinitrophenols were oxidized by 30% and 73% respectively.

"Hydrogen Peroxide Treats Diverse Wastewaters" by Strunk at pages 32 to 35 of the January/February, 1979, issue of *Industrial Wastes* teaches that phenol oxidation with hydrogen peroxide in the presence of ferrous salt at a pH of about 4 and a hydrogen peroxide to phenol weight ratio of 1:1 (2.7:1 mole ratio) proceeds rapidly over a 70°–100° F. (21°–38° C.) temperature range. At 120° F. (40° C.), phenol removal efficiency decreases.

United Kingdom Patent Application GB No. 2,056,962A to Pouillot et al. teaches a process for purifying waste water from factories producing dyes or from dye-works. The waste water is stated as containing coloring matter, but treatment of nitrophenols is not taught. The process involves two steps—oxidation with hydrogen peroxide and then coagulation, flocculation and decantation. The oxidation step can be catalyzed with a ferrous salt and is preferably carried out at a pH of less than 5.

Japanese Patent Publication No. 77,449/1974 to Okawa et al. teaches a process for the treatment of phenols at a pH of between 2.5 and 3.5 in the presence of ferric chloride followed by treatment with hydrogen peroxide. The pH is then raised to about 10 to precipitate the ferric chloride as ferric hydroxide after which floculents are added and the supernatent liquid is separated from the precipitated matter. Treatment of nitrophenols is not taught.

U.S. Pat. No. 3,637,761 to Kuwata et al. teaches a process for making highly pure trimellitic anhydride from impure trimellitic acid solution containing nitrocompounds, such as picric acid, as impurities. The process first treats the crude trimellitic acid by a conventional reduction method to convert the nitrocompounds into amines or hydroxylamines. The trimellitic acid is then recovered and dehydrated to form the highly pure trimellitic anhydride and then distilled. One of the reduction methods involves treatment with acid in the presence of iron or ferrous chloride. Hydrogen peroxide is not used.

SUMMARY OF INVENTION

This invention is a process to destroy polynitrophenols, particularly trinitrophenols such as picric acid (2,4,6-trinitrophenol) and styphnic acid (2,4,6-trinitroresorcinol), or their salts in aqueous waste by treating the waste with between 2 and 10 moles of hydrogen peroxide per mole of combined nitrophenols in the presence of a soluble iron compound, at a pH of less than 4 and at a temperature of greater than 65° C. The destruction of the relatively stable nitrophenols is more than 80% complete in less than 1 hour. Of course, 100% destruction is always theoretically possible if enough chemicals are used, but in almost all such cases the costs are high and also a complete destruction of environmentally noxious chemicals may not be essential. The process of this invention accomplishes very high degree of abatement at significantly lower cost both in terms of chemical use and equipment complexity than in the case of other methods used to abate nitrophenol pollution.

DETAILED DESCRIPTION

Nitrophenol waste in an aqueous stream may originate from benzene nitration, phenol nitration or other manufacturing processes, as well as from operations which use, formulate, store or otherwise consume nitrophenols. The nitrophenols of this process may be in combination with other nitroaromatics, nitroorganics or other oxidizable chemical compounds.

The nitrophenols of the subject process may be in homogeneous solution in the waste stream or may be in a supersaturated, i.e., undissolved form at the ambient temperatures. More typically, the concentration of dinitro- and trinitrophenols would be about 1 to 5% W/V of the waste. A typical composition of the waste treated in this process was 0.6% m-dinitrobenzene, 1.12% styphnic acid (2,4,6-trinitroresorcinol) and 0.71% picric acid (2,4,6-trinitrophenol), all concentrations expressed as W/V. The typical waste might have undissolved nitrocompounds at room temperature, but at about the operating temperature of the process, these compounds completely dissolve. It is preferred to conduct the process of this invention in a homogeneous solution, for better operability and greater efficiency.

The process uses hydrogen peroxide, obtained from any commercial sources in any concentrations, at a level of at least 2 moles of hydrogen peroxide per mole of the nitrophenols. There is no upper limit to the amount of hydrogen peroxide, but about 10 moles of hydrogen peroxide per mole of nitrophenol is probably the upper limit of a cost-effective use of this oxidizing agent. Preferred limits are 4–10 and most preferred limits are 7–10 moles of hydrogen peroxide per mole of nitrophenol.

Any chemical that will generate hydrogen peroxide in the reaction mixture would be acceptable for nitrophenol destruction by this process. Examples of acceptable compounds are alkali metal perborates, percarbonates and persulfates and urea, magnesium, calcium, sodium and potassium peroxides. The preferred compounds are those containing the sodium ion. The hydrogen-peroxide-generating chemical should dissolve in the reaction mixture.

An iron compound which is soluble in the reaction mixture is used in the process. The compound may be a salt containing ferrous or ferric iron, or both together. It may be in combination with other metal ions such as ammonium, sodium, potassium, magnesium, calcium, aluminum, manganese, copper, and nickel. Thus, double salts of these metal ions with iron would be acceptable. Any other metal ions may be present in the nitrophenol solutions or wastes, either before or during the reaction catalyzed by iron.

The amount of iron ion needed is about 0.002 to about 0.7 moles per mole of nitrophenols, preferably 0.02 to 0.2 moles per mole. The upper limit is defined by the trade-off between wasteful hydrogen peroxide decomposition by iron and useful iron catalysis of hydrogen peroxide destruction of nitrophenols. The lower limit is defined by the kinetics of the reaction.

Preferred sources of iron depend on economics. Low cost compounds such as $FeSO_4$, $FeCl_3$, and $Fe(NH_4)_2(SO_4)_2$ are examples of preferred compounds. $FeCl_3$, a cheap by-product of the $TiO_2$ 1 manufacturing processes, is particularly preferred. It is immaterial whether ferrous or ferric iron is added to the process because eventually all the iron is converted to its ferric form under reaction conditions.

One skilled in the art can easily calculate higher amounts of iron compounds and hydrogen peroxide that might be needed as a result of other nitroaromatics, nitroorganics or other oxidizable chemical compounds being in combination with the nitrophenols in the waste. These higher levels are considered to be equivalents of the levels claimed.

The reaction pH should be less than about 4, and preferably between 1 and 3. A reaction that is started at a pH of about 7 is slower. Such a reaction will show a gradual decrease in pH as the oxidation of nitrophenols to the open chain carboxylic acids takes place. So a reaction mixture of a higher starting pH (lower acidity) would eventually approach and operate at the lower pH (higher acidity) of less than about 4. At higher pH, the hydrogen peroxide will decompose in the presence of iron and will be less available for oxidation once the lower pH is reached.

Any necessary pH adjustment of the reaction mixture is preferably done by addition of a mineral acid such as hydrochloric acid and sulfuric acid. Nitric acid, while theoretically acceptable, would probably introduce safety problems, and therefore is least preferable.

The temperature of the reaction should be at least about 65° C., preferably between 80° and 100° C. and most preferably between 90° C. and 100° C.

The time for at least about 80% destruction of nitrophenols is between 3 minutes to 1 hour, depending on the amounts of the chemicals used, the amount of nitrophenols initially present, and any other organic load in the waste stream.

The process may be run in any conventional well-mixed reactor in a batchwise or continuous mode. A batch process may be run in a suitable reactor in which a heated waste solution is efficiently stirred. An acid may then be added to the batch, followed by the iron compound (preferably in solution form) and hydrogen peroxide. The reactor should be adequately vented. If dissolution of the nitrophenols is difficult more water may be added to decrease the degree of saturation. After the specified time the batch may be cooled and discharged, with further dilution with water if necessary. A continuous process may be operated with continuous streams of the waste, acidified iron solution and diluted hydrogen peroxide solution mixing in a pipeline jacketed reactor or a continuous stirred tank reactor that would allow enough time for the nitrophenols to be destroyed to desired levels.

When ferrous iron is used, the steps of pH adjustment, iron addition and temperature adjustment may be in any order. When ferric iron is used, the pH preferably should be adjusted prior to iron addition since ferric iron is soluble only in an acid solution. The hydrogen peroxide should preferably be added after the addition of the iron and more preferably after the temperature is raised. To be useful in the process, all ions must be soluble in the waste. Therefore, the sequence is important for economic reasons.

EXAMPLES

The following examples are given to illustrate the invention and not to limit it.

EXAMPLE 1

In each of the experiments set forth in Tables 1 and 2, one hundred milliliters (100 ml) of ammonia-neutralized nitrophenol waste from the nitration of benzene, containing about 0.71w/v% picric acid, 1.12w/v% styphnic acid and 0.6w/v% 2,4-dinitrobenzene, was treated with ferrous ammonium sulfate $[Fe(NH_4)_2(SO_4)_2 \cdot 6H_2O]$ and then hydrogen peroxide for one (1) hour at 70° C. while maintaining good mixing.

TABLE 1

| EXPER. | N—Phenols IN WASTE ml. | mmol | IRON ADDED mg. | mmol | $H_2O_2$ 100% BASIS gm. | mmol | MOLE RATIOS $Fe^{++}$ | $H_2O_2$ |
|---|---|---|---|---|---|---|---|---|
| 1. | 100 | 7.7 | 10 | 0.18 | 0.283 | 8.32 | 0.0233 | 1.1 |
| 2. | 100 | 7.7 | 10 | 0.18 | 2.250 | 66.18 | 0.0233 | 8.6 |
| 3. | 100 | 7.7 | 1 | 0.018 | 2.690 | 79.12 | 0.00233 | 10.3 |
| 4. | 100 | 7.7 | 0.43 | 0.008 | 0.420 | 12.35 | 0.001 | 1.6 |

After the reactions were complete, the pH's were measured and the APHA color test was used to determine the extent of nitrophenol destruction.

The APHA color test in each case entailed neutralizing the treated waste with a lime slurry to a pH of 7.9 (the same pH as that of the starting waste) and filtering.

One milliliter (1 ml) of the filtrate in each case was diluted to 1000 ml with deionized water. A 1 ml sample of the untreated waste was also diluted to 1000 ml with deionized water as a control. APHA color of the dilute solutions was measured. Table 2 presents the results.

TABLE 2

| EXPER-IMENT | pH OF REACTION MIXTURE BEFORE pH ADJUSTMENT[1] | APHA COLOR | REMARKS |
| --- | --- | --- | --- |
| UNTREATED | 7.9 | 800 | FAILED |
| 1. | 4.5 | 800 | FAILED |
| 2. | 1.0 | 100 | PASSED |
| 3. | 1.0 | 125 | PASSED |
| 4. | 7.0 | 700 | FAILED |

[1]pH as measure before addition of lime for the APHA color test.

As can be seen in Table 2, there was significant reduction in color due to nitrophenol destruction in experiments 2 and 3. A reduction from an APHA color of 800 to less than about 130 is needed for the destruction to pass the test. Both experiments 2 and 3 yielded samples that were acceptable for discharge to the receiving stream. The low pH of the final reaction mixture in experiments 2 and 3 are indicative of efficient reactions.

EXAMPLE 2

This example is intended to show the effect of temperature. One hundred milliliters (100 ml) of unneutralized (pH of about 2) nitrophenol-containing waste from the nitration of benzene was treated with 35.1 milligrams (0.0895 m moles) of ferrous ammonium sulfate [Fe(NH$_4$)$_2$(SO$_4$)$_2$.6H$_2$O] and then 2.024 grams of 70% hydrogen peroxide (41.67 m moles) for 1 hour at 60° C. while maintaining good mixing. The Fe$^{++}$:nitrophenol mole ratio was 0.0116:1. The H$_2$O$_2$:nitrophenol mole ratio was 5.41:1. The solution, which remained dark, was neutralized to a pH of 7.0 with calcium hydroxide and filtered. One milliliter (1 ml) of the filtrate was diluted to 1000 ml with deionized water and was compared to 1 ml of the untreated waste diluted to 1000 ml. The color of the treated waste was comparable to that of the untreated waste and was, thus, unacceptable.

EXAMPLE 3

In each of the experiments set forth in Tables 3 and 4, one hundred milliliters (100 ml) of nitrophenol waste from the nitration of benzene, containing about 0.67 w/v% picric acid and 0.88 w/v% styphnic acid and having an initial pH of 9, was acidified with a 10% hydrochloric acid and a solution to a pH of about 2-3 as measured by pH paper and treated with anhydrous ferric chloride and then hydrogen peroxide at 88° C. to 90° C. while maintaining good mixing.

TABLE 3

| | N—PHENOLS IN WASTE | | ANHYDROUS FeCl$_3$ ADDED | | H$_2$O$_2$ 100% BASIS | | MOLE RATIOS | |
| --- | --- | --- | --- | --- | --- | --- | --- | --- |
| EXPER. | ml. | mmol | grams | mmol | grams | mmol | Fe$^{+++}$ | H$_2$O$_2$ |
| 1. | 100 | 6.5 | 0.26 | 1.6 | 2.128 | 65.6 | 0.246 | 9.63 |
| 2. | 100 | 6.5 | 0.13 | 0.8 | 2.128 | 65.6 | 0.123 | 9.63 |
| 3. | 100 | 6.5 | 0.39 | 2.4 | 2.128 | 65.6 | 0.369 | 9.63 |

In each of the experiments the acidic waste solution was heated while being mixed to 88 to 90° C. Anhydrous ferric chloride was added first followed by the addition of 3.04 grams of 70% hydrogen peroxide. Within 15 minutes, the color of the solutions faded to pale yellow. The solutions were cooled and the APHA color test described in Example 1 was run. Also, the concentrations of the nitrophenols were determined by spectrophotometric analysis. The results are given in Table 4.

TABLE 4

| EXPER. | APHA COLOR | WT % N—PHENOLS IN SOLUTION | % N—PHENOLS DESTROYED |
| --- | --- | --- | --- |
| UNTREATED | 700 | 1.55 | 0 |
| 1. | 100 | 0.19 | 87.7 |
| 2. | 60 | 0.11 | 92.9 |
| 3. | 80 | 0.20 | 87.1 |

EXAMPLE 4

Ten (10) grams of waste containing 70 milligrams (0.28 m moles) of ammonium picrate was diluted with 90 grams of deionized water. The pH was adjusted to 2.2 by the addition of a 20% solution of sulfuric acid. To this was added 49.8 mg (0.18 m moles) FeSO$_4$.7H$_2$O. The solution was heated to 90°-95° C. while being stirred. The solution at this time was yellow. Hydrogen peroxide [2.57 gm of 3.1% solution (2.34 m moles)] was then slowly added. The molar ratios of Fe$^{++}$ to picrate and of hydrogen peroxide to picrate were 0.64 and 8.37, respectively. Immediately after hydrogen peroxide addition started, the yellow solution turned dark green. Soon after the hydrogen peroxide addition was completed, the solution turned a pale yellow. Elapsed time after hydrogen peroxide addition was about 5 minutes. The final pH was 1.79. The solution was cooled and analyzed by liquid chromotography. No ammonium picrate or nitrophenol was detected in the treated solution.

EXAMPLE 5

Twenty five (25) grams of a solution containing 7000 ppm sodium picrate was diluted with 75 gm of deionized water. To seventy five (75) grams (0.523 m moles of picrate) of the diluted solution was added enough 10% hydrochloric acid to reduce the pH to 2.9. To this was added 18.75 mg (0.0675 m moles) of FeSO$_4$.7H$_2$O. The solution was heated to 85° C. while being stirred. The solution at this time was yellow. Hydrogen peroxide [4.2 gm of 3.1% solution (3.83 mmoles)] was added dropwise. The molar ratios of Fe$^{++}$ to picrate and of hydrogen peroxide to picrate were 0.129 and 7.32, respectively. As the hydrogen peroxide was being added, the color changed from the yellow to amber to brown and then to dark green. Approximately 5 minutes after all the hydrogen peroxide was added, the color reverted to a canary yellow. It finally turned to a pale brown. The total reaction time after hydrogen peroxide addition was 15 minutes. The temperature of the reaction stayed in the range of 85°-92° C. The final pH was 2.07. The solution was cooled and analyzed by liquid chromotography. No sodium picrate or nitrophenols was detected in the treated solution.

I claim:

1. A process for sufficiently destroying trinitrophenols or their salts in an aqueous waste by breaking the ring structure to reduce the color of the aqueous waste to an acceptable level comprising the following steps:
   a. controlling the pH of said waste at between 1 and 4,
   b. adding sufficient iron salt to provie from 0.002 to 0.7 moles of iron ion per mole of trinitrophenol in said waste,
   c. maintaining the temperature of said waste at greater than 65° C., and
   d. adding at least 2 moles of hydrogen peroxide per mole of trinitrophenol in said waste after the addition of the iron salt to reduce the color of said waste to an acceptable level.

2. The process of claim 1 wherein the pH is controlled at between 1 and 3.

3. The process of claim 1 wherein the temperature is between 80° and 100° C.

4. The process of claim 1 wherein the iron salt is a ferrous salt.

5. The process of claim 1 wherein the iron salt is a ferric salt.

6. The process of claim 5 wherein the iron salt is added after the pH is less than 4.

7. The process of claim 6 wherein the pH is controlled between 1 and 3.

8. The process of claim 7 wherein the temperature is between 80° and 100° C.

9. The process of claim 6 wherein the hydrogen peroxide is added after the temperature is greater than 65° C.

10. The process of claim 9 wherein the hydrogen peroxide is added at 4–10 moles per mole of trinitrophenol.

11. The process of claim 10 wherein the hydrogen peroxide is added at 7–10 moles per mole of trinitrophenol.

12. The process of claim 1 wherein the hydrogen peroxide is added after the temperature is greater than 65° C.

13. The process of claim 1 wherein the hydrogen peroxide is added at 4–10 moles per mole of trinitrophenol.

14. The process of claim 13 wherein the hydrogen peroxide is added at 7–10 moles per mole of trinitrophenol.

* * * * *